US012790510B2

(12) United States Patent
Schwarte et al.

(10) Patent No.: US 12,790,510 B2
(45) Date of Patent: Nov. 10, 2026

(54) TINTED CLEARCOAT COMPOSITION AND PROCESS OF PRODUCTION SUCH TINTED CLEARCOAT COMPOSITION

(71) Applicant: BASF COATINGS GMBH, Muenster (DE)

(72) Inventors: Stephan Schwarte, Muenster (DE); Jan Edelbrock, Muenster (DE); Alexander Hibbe, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 7 days.

(21) Appl. No.: 18/718,888

(22) PCT Filed: Jan. 9, 2023

(86) PCT No.: PCT/EP2023/050260
§ 371 (c)(1),
(2) Date: Jun. 12, 2024

(87) PCT Pub. No.: WO2023/135067
PCT Pub. Date: Jul. 20, 2023

(65) Prior Publication Data

US 2024/0417591 A1 Dec. 19, 2024

(30) Foreign Application Priority Data

Jan. 13, 2022 (EP) .................................... 22151319

(51) Int. Cl.

| | |
|---|---|
| ***C09D 175/06*** | (2006.01) |
| ***B05D 1/02*** | (2006.01) |
| ***B05D 3/02*** | (2006.01) |
| ***B05D 5/06*** | (2006.01) |
| ***B05D 7/00*** | (2006.01) |
| ***C08G 18/62*** | (2006.01) |
| ***C08G 18/79*** | (2006.01) |
| ***C09D 5/00*** | (2006.01) |
| ***C09D 7/61*** | (2018.01) |
| ***C09D 7/80*** | (2018.01) |
| ***C09D 175/04*** | (2006.01) |

(52) U.S. Cl.
CPC ........... *C09D 175/06* (2013.01); *B05D 5/066* (2013.01); *B05D 7/532* (2013.01); *C08G 18/6229* (2013.01); *C08G 18/792* (2013.01); *C09D 5/00* (2013.01); *C09D 7/61* (2018.01); *C09D 7/80* (2018.01); *C09D 175/04* (2013.01); *B05D 1/02* (2013.01); *B05D 3/0254* (2013.01); *B05D 7/572* (2013.01)

(58) Field of Classification Search
CPC .......... C09D 175/06; C09D 7/61; C09D 7/80; C09D 5/00; C09D 175/04; B05D 5/066; B05D 7/532; B05D 7/572; B05D 1/02; B05D 3/0254; C08G 18/792; C08G 18/6229
See application file for complete search history.

(56) References Cited

U.S. PATENT DOCUMENTS 7,183,000 B2 2/2007 Hall et al.

FOREIGN PATENT DOCUMENTS

| | | | |
|---|---|---|---|
| EP | 0813911 | A2 | 12/1997 |
| EP | 1406978 | B1 | 3/2015 |
| EP | 2883919 | A1 | 6/2015 |
| JP | 2005137952 | A | 6/2005 |
| JP | 2005138057 | A | 6/2005 |
| JP | 2021130812 | A | 9/2021 |
| WO | 2021224232 | A1 | 11/2021 |
| WO | 2023081471 | A1 | 5/2023 |

OTHER PUBLICATIONS

International Search Report for PCT/EP2023/050260 dated Mar. 9, 2023, 4 pages.
Written Opinion for PCT/EP2023/050260 dated Mar. 9, 2023, 4 pages.

*Primary Examiner* — Patrick D Niland
(74) *Attorney, Agent, or Firm* — Armstrong Teasdale LLP

(57) ABSTRACT

Disclosed herein is a tinted clearcoat composition including at least one binder resin (A) having functional groups (i), at least one curing agent (B) having functional groups (ii) being reactive with the functional groups (i), and at least one pigment (C), where the tinted clearcoat composition (TCC) is produced by (a) providing a clearcoat system (CS) including at least one binder resin (A) and at least one curing agent (B), (b) providing at least one pigment premixture (PP) including at least one pigment (C), (c) combining all or part of the clearcoat system (CS) with at least one pigment premixture (PP), (d) milling the mixture obtained in step (c), and (e) mixing, if applicable, the mixture obtained in step (d) with any yet missing parts of the tinted clearcoat composition (TCC).

20 Claims, No Drawings

TINTED CLEARCOAT COMPOSITION AND PROCESS OF PRODUCTION SUCH TINTED CLEARCOAT COMPOSITION

CROSS-REFERENCE TO RELATED APPLICATIONS

This application is a U.S. National Phase Application of International Patent Application No. PCT/EP23/50260, filed Jan. 9, 2023, which claims priority to EP Patent Application No. 22151319.5 filed Jan. 13, 2022, each of which is hereby incorporated by reference herein.

The present invention relates to tinted clearcoat composition comprising at least one binder resin (A), at least one curing agent (B) and at least one pigment (C), whereby production of the tinted clearcoat composition involves a specific step of milling, namely milling of a mixture comprising at least one pigment premixture (PP) and all or part of a clearcoat system. The present invention also relates to a process of production of the beforementioned tinted clearcoat composition including the specific step of milling. The present invention likewise relates to a multilayer coating comprising a layer (also named film) produced by means of the tinted clearcoat composition and also a process of producing such a multilayer coating. Finally, the present invention relates to the use of the tinted clearcoat composition to improve the coloristic properties of a coating, in particular a multilayer coating.

BACKGROUND OF THE INVENTION

Coloristic properties of coatings, in particular multilayer coatings, play a major role in different coating-related industry sectors like the automotive coating industry. As known, traditionally, the color and/or effect of a coating is mainly influenced by basecoat compositions (i.e. coating compositions containing comparably high amounts of pigments and thus having high opacity, meaning that the respective basecoat coating layers finally determine the color of the overall coating to a major extent). The clearcoat compositions and layers produced therefrom, respectively, traditionally have their major function in weathering resistance, mechanical stability (for example scratch resistance) and also gloss properties, appearance and transparency (i.e. esthetic properties not mainly relating to the color as such).

As known, in more recent times, however, efforts have been made to achieve also specific coloristic properties by tinted clearcoat compositions and respective coating layers. Thereby, the tinted clearcoats contain specific amounts of pigments, i.e. amounts that, at the same time, contribute to the overall color of a coating, but still do not lead to full opacity, thus allowing for visual perception of the below basecoat layer. While the overall characteristics, properties and functions of a clearcoat, quite obviously, are meant to be maintained, the tinting contributes to very particular coloristic properties of the overall coating like excellent chroma (colorfulness, color depth) and hue. By aligning the coloristic properties of the basecoat with those of the tinted clearcoat (or even more than one tinted clearcoat), remarkable color qualities and variations are achievable.

However, a fundamental concern in this regard lies in achieving proper transparency of the tinted clearcoat compositions and respective coatings, i.e. coatings which show a very high transparency and thus low haze. Integration of the pigments into the underlying clearcoat system is a major challenge. Without such excellent integration, a hazy and milky optical impression might be the result.

EP1406978B1 discloses coating compositions comprising a plurality of colorants in form of pigment pastes, wherein the pigment pastes are intensively milled and thus contain the pigments in very low particle size. The coating compositions serve for good color matching with already existing coatings, for example within refinish processes. Accordingly, the coating compositions serve as basecoat compositions. The low particle size of the pigments in the pastes is correlated with a low haze and thus high transparency of the pigment pastes. Also, these properties of the pastes are described as being responsible for the excellent properties of the final coating layer.

EP2883919A1 discloses colored coating compositions, in particular with dark colors, that still transmit infrared radiation and exhibit high color stability. Again, the low haze (high transparency) of the pastes is correlated with the advantageous properties of the resulting coating composition and final coating.

Problem

It has been an object underlying the present invention to provide a tinted clearcoat composition providing for excellent coloristic properties of coatings (i.e. multilayer coatings) like high chroma (colorfulness, color depth) and hue. More particularly, it was an object to contribute to the beforementioned properties by achieving excellent transparency and thus low haze of the final tinted clearcoat layer and thus multilayer coating.

Solution

This object has been solved by the subject-matter of the claims of the present application as well as by the preferred embodiments thereof disclosed in this specification, i.e., by the subject matter described herein.

A first subject-matter of the present invention is a tinted clearcoat composition (TCC) comprising at least one binder resin (A) having functional groups (i), at least one curing agent (B) having functional groups (ii) being reactive with the functional groups (i) and at least one pigment (C), whereby the tinted clearcoat composition (TCC) is producible by (a) providing a clearcoat system (CS) comprising at least one binder resin (A) and at least one curing agent (B), (b) providing at least one pigment premixture (PP) comprising at least one pigment (C), (c) combining all or part of the clearcoat system (CS) with at least one pigment premixture (PP), (d) milling the mixture obtained in step (c), (e) mixing, if applicable, the mixture obtained in step (d) with any yet missing parts of the tinted clearcoat composition (TCC).

A further subject-matter of the present invention is a process of producing a tinted clearcoat composition (TCC) comprising at least one binder resin (A), at least one curing agent (B) and at least one pigment (C), comprising the following steps:

(1) providing a clearcoat system (CS) comprising at least one binder resin (A) and at least one curing agent (B), (2) providing at least one pigment premixture (PP) comprising at least one pigment (C), (3) combining all or part of the clearcoat system (CS) with at least one pigment premixture (PP), (4) milling the mixture obtained in step (c), (5) mixing, if applicable, the mixture obtained in step (d) with any yet missing parts of the tinted clearcoat composition (TCC).

Also, a subject-matter of the present invention is a multilayer coating comprising a layer prepared by the tinted clearcoat composition and also a process of producing such a multilayer coating. Finally, a subject-matter of present invention is a use of the tinted clearcoat composition to improve the coloristic properties of a coating, in particular a multilayer coating.

As will be evident from the following description and example section, within the present invention it was found that surprisingly and contrary to what the prior art indicates a low haze (high transparency) of a pigment paste or pigment premixture, respectively, is not sufficient to predict and obtain excellent coloristic properties of the finally resulting coating. Instead, while the haze of the pigment paste or pigment premixture surely has an influence, the overall picture and correlation also heavily depends on compatibility of the pigment paste/pigment premixture with the underlying clearcoat material into which the pigment paste/pigment premixture is included to produce a tinted clearcoat material. The present invention achieves to reach this compatibility by a specific production process of the tinted clearcoat composition, in particular by means of a specific milling step as outlined below.

DETAILED DESCRIPTION OF THE INVENTION

The term "comprising" in the sense of the present invention, in connection for example with the tinted clearcoat composition of the invention, includes, but does not only has the meaning of "consisting of". "Consisting of" may also be called "Only comprising" or "Exclusively comprising", i.e. "comprising" may be called a generic term which includes the specific term "consisting of".

The term "one" also includes the meaning "at least one", if not explicitly stated differently.

The proportions and amounts in wt.-% (% by weight) of any of the constituents given hereinafter, which are present in a composition, add up to 100 wt.-%, based in each case on the total weight of the respective composition, if not explicitly stated differently.

Inventive Tinted Clearcoat Composition (TCC)

The inventive coating composition is a tinted clearcoat composition.

As known, a (non-tinted) clearcoat composition is a composition being transparent and colorless, thus not containing perceivable amounts of pigments, preferably no pigment at all. As also known, in many industrial coating applications, such as the automotive coating industry, a clearcoat layer is the upmost coating layer in a multilayer coating and thus depicts the layer being in contact with the environment. Accordingly, besides properties like gloss, appearance and transparency, main function and properties that need to be fulfilled are weathering resistance, mechanical stability against, for example, scratch, and UV stability.

A tinted clearcoat composition remains a clearcoat composition with functions, properties and application specifics as outlined above; however, it is not completely transparent and colorless. Instead, it contains certain amounts of constituents providing for a color, in particular pigments. On the other hand side, a tinted clearcoat composition does not provide for a completely or almost completely opaque layer and, by this means, is clearly differentiated from typical colored basecoat compositions. Therefore, a tinted clearcoat compositions and coatings produced thereof are both transparent and colored (also called semitransparent and colored). Quite obviously, the degree and level of semitransparent and colored character is variable and depends, in particular, on the amount of coloring constituents, in particular pigments.

Clearcoat System

The inventive tinted clearcoat composition (TCC) is based on (and thus comprises) a clearcoat system (CS). A clearcoat system, in the context of the present invention, quite obviously, is a recipe and a respective formulation that makes up a clearcoat composition, i.e., a composition that may already be used as clearcoat composition (whereby, as always, if appropriate and/or required, certain amounts of constituents like solvents in order to adjust, for example, application viscosity may be added for completion at a later stage, of course).

However, the clearcoat system (CS) (and respective clearcoat composition) does not already contain a respective pigment premixture (PP) (as defined below), meaning that the pigment premixture (PP) needs to be combined with the clearcoat system in order to produce the tinted clearcoat composition (TCC).

The clearcoat system (CS) comprises at least one binder resin (A) having functional groups (i) and at least one curing agent (B) having functional groups (ii) being reactive with the functional groups (i). These constituents may be selected according to individual needs and requirements and may be chosen from the compounds being known to be applicable in clearcoat compositions. The same applies for the functional groups (i) and (ii).

The binder resin (A) may be selected from the group consisting of polyurethanes, polyureas, polyesters, polyamides, polyethers, poly(meth)acrylates and/or copolymers of the structural units of said polymers. The at least binder resin (A) is particularly preferably selected from the group consisting of polyurethanes, polyesters, poly(meth)acrylates and/or copolymers of the structural units of said polymers. The term "(meth)acryl" or "(meth)acrylate" in the context of the present invention in each case comprises the meanings "methacrylic" and/or "acrylic" or "methacrylate" and/or "acrylate".

The at least one binder resin (A) has functional groups (i) being reactive with the functional groups (ii) of the below described at least one curing agent (B). Any common crosslinkable functional groups known to those skilled in the art may be chosen as functional groups (i) and (ii). Preferably, the binder resin (A) has functional groups (i) selected from the group consisting of primary amino groups, secondary amino groups, hydroxyl groups, thiol groups, carboxyl groups and carbamate groups. Preferably, at least one binder resin (A) has hydroxyl groups as functional groups (i).

Preferably, at least one binder resin (A) has an OH number in the range of 15 to 400 mg KOH/g, more preferably from 20 to 250 mg KOH/.

The curing agent (B) may preferably be selected from aminoplast resins and/or blocked or free polyisocyanates. Among the aminoplast resins, melamine resins such as melamine-formaldehyde resins are preferred. Among the polyisocyanates, free polyisocyanates are particularly preferred. In this case, quite obviously, the clearcoat system (CS) and thus the tinted clearcoat composition (TCC) preferably is a two-component system/composition. In a particularly preferred embodiment, a free polyisocyanate is selected as a curing agent (B) and the clearcoat system is a two-component system. This, however, does not exclude that the clearcoat system also comprises further hardener components like a melamine resin which could then also be part of the main binder component of such a two-component system.

Accordingly, the functional groups (ii) are preferably selected from blocked or free isocyanate groups and methylol groups.

The clearcoat system (CS) and also the inventive tinted clearcoat composition (TCC) preferably are solvent-based. In the context of the present invention, a solvent-based coating system or composition preferably comprises a total amount of water of less than 10 wt.-%, preferably less than 5 wt.-%, more preferably less than 1 wt.-%, very preferably 0 wt.-%, based in each case on the total weight of the coating composition. Accordingly, the diluents (solvents) applied within the composition are of organic character, i.e. organic solvents. The at least one organic solvent is preferably present in a total amount of 10 to 70 wt.-%, more preferred 20 to 60 wt.-% and most preferred from 30 to 50 wt.-%, based in each case on the total weight of the clearcoat system (CS)/tinted clearcoat composition (TCC).

Suitable solvents may be selected from aliphatic and/or aromatic hydrocarbons, such as toluene, xylene, solvent naphtha, Solvesso 100 or Hydrosol® (from APAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents.

Further constituents which may be part of the clearcoat system (CS) are customary and known coating additives in typical amounts. Preferably, the amounts are from 0.01 to 20 wt.-%, more preferably from 0.1 to 10 wt.-%, based in each case on the total weight of the clearcoat system (CS).

Examples of suitable coating additives are UV absorbers; light stabilizers such as HALS compounds, benzotriazoles or oxalanilides; rheology modifiers such as sagging control agents (urea modified resins); organic thickeners and inorganic thickeners; free-radical scavengers; slip additives; polymerization inhibitors; defoamers; wetting agents; dispersants; emulsifiers; fluorine compounds; adhesion promoters; curing catalysts, leveling agents; film-forming auxiliaries such as cellulose derivatives; fillers, such as nanoparticles based on silica, alumina or zirconium oxide; flame retardants; and mixtures thereof.

Preferably, the clearcoat system (CS) and thus also the inventive tinted clearcoat composition comprises in any case at least one rheology modifier selected from the group of urea modified resins, in particular urea modified poly(meth) acrylates.

As known, typically, coating compositions comprising binder and curing agent may be formulated as one-component or two-component coating compositions, whereby this majorly depends on the selection of the curing agent (and the temperature at which the functional groups (ii) start to react with the functional groups (i) of the binder (A)). The technical circumstances in this regard are general knowledge and do not require any further explanation.

As also known, in case of two-component coating compositions it is standard that the two components (also named main binder component (I) and hardener component (II)) are as such that component (I) contains, besides the binder resins (resin constituents) and solvents, all or at least the majority of all further constituents like typical additives, while the hardener component in most cases comprises only the curing agent, solvents and only a minor number or portion of additives, for example the curing catalyst. These circumstances, quite obviously, also apply for the clearcoat system (CS) and the inventive tinted clearcoat composition (TCC).

Preferably, the clearcoat system and thus also the inventive tinted clearcoat composition (TCC) is formulated as a two-component coating system/composition. Therefore, a main binder component (I) comprising the at least one binder (A) is provided and a hardener component (II) comprising a curing agent (B) is provided, whereby components (I) and (II) are produced and stored separately from each other and are then mixed prior to use, preferably shortly before application to a substrate.

Production of the clearcoat system (CS) may be conducted by conventional means, i.e. mixing the respective constituents of the clearcoat system (CS) (or of components (I) and (II) separated from each other in case of two-component compositions, respectively) in standard mixing equipment. Of course, not only in case of two-component clearcoat systems (CS) it is conceivable to not mix all constituents in their full amounts at once, but to have mixed only part of the constituents (either their entire amount or only part of their entire amounts) and hold back the residual constituents/amounts to be mixed and combined at a later stage. Reason why this is explicitly mentioned here is step (c) as outlined below and the embodiment where only part of the clearcoat system (CS) is combined: "combining part of the clearcoat system (CS) with the pigment premixture (PP)". As in this embodiment only part of the clearcoat system (CS) is combined the pigment premixture (PP)—and thus the residual part of the clearcoat system is only added at a later stage (cf. step (e) as described below)—it is likewise required that only those constituents and amounts of the clearcoat system making up this part of the clearcoat system are mixed before the pigment premixture (PP) is added. However, as the clearcoat system also in this scenario is fully defined (by (i) the part to be combined with the pigment premixture (PP) and (ii) the residual part to be added in step (e)), this procedure also means that a clearcoat system (CS) is provided in the sense of step (a) as mentioned below.

The procedure described in the presentence still is within the meaning and scope of "providing a clearcoat system (CS)" according to step (a) described below.

Pigment Premixture (PP)

The inventive tinted clearcoat composition (TCC) comprises at least one pigment premixture (PP). A pigment premixture, quite obviously, comprises at least one pigment (C), preferably exactly one pigment (i.e., one kind of pigment).

Suitable pigments are, for example, organic and inorganic coloring pigments, effect pigments and mixtures thereof. Such color pigments and effect pigments are known to those skilled in the art and are described, for example, in Römpp-Lexikon Lacke und Druckfarben, Georg Thieme Verlag, Stuttgart, New York, 1998, pages 176 and 451. The terms "coloring pigment" and "color pigment" are interchangeable, just like the terms "visual effect pigment" and "effect pigment". Suitable inorganic coloring pigments are selected from (i) white pigments, such as titanium dioxide, zinc white, colored zinc oxide, zinc sulfide, lithopone; (ii) black pigments, such as iron oxide black, iron manganese black, spinel black, carbon black; (iii) color pigments, such as ultramarine green, ultramarine blue, manganese blue, ultramarine violet, manganese violet, iron oxide red, molybdate red, ultramarine red, iron oxide brown, mixed brown, spinel and corundum phases, iron oxide yellow, bismuth vanadate; (iv) filer pigments, such as silicon dioxide, quartz flour, aluminum oxide, aluminum hydroxide, natural mica, natural and precipitated chalk, barium sulphate and (vi) mixtures thereof.

Suitable organic coloring pigments are selected from (i) monoazo pigments such as C.I. Pigment Brown 25, C.I. Pigment Orange 5, 36 and 67, C.I. Pigment Orange 5, 36 and 67, C.I. Pigment Red 3, 48:2, 48:3, 48:4, 52:2, 63, 112 and 170 and C.I. Pigment Yellow 3, 74, 151 and 183; (ii) diazo pigments such as C.I. Pigment Red 144, 166, 214 and 242, C.I. Pigment Red 144, 166, 214 and 242 and C.I. Pigment Yellow 83; (iii) anthraquinone pigments such as C.I. Pigment Yellow 147 and 177 and C.I. Pigment Violet 31; (iv) benzimidazole pigments such as C.I. Pigment Orange 64; (v) quinacridone pigments such as C.I. Pigment Orange 48 and 49, C.I. Pigment Red 122, 202 and 206 and C.I. Pigment Violet 19; (vi) quinophthalone pigments such as C.I. Pigment Yellow 138; (vii) diketopyrrolopyrrole pigments such as C.I. Pigment Orange 71 and 73 and C.I. Pigment Red, 254, 255, 264 and 270; (viii) dioxazine pigments such as C.I. Pigment Violet 23 and 37; (ix) indanthrone pigments such as C.I. Pigment Blue 60; (x) isoindoline pigments such as C.I. Pigment Yellow 139 and 185; (xi) isoindolinone pigments such as C.I. Pigment Orange 61 and C.I. Pigment Yellow 109 and 110; (xii) metal complex pigments such as C.I. Pigment Yellow 153; (xiii) perinone pigments such as C.I. Pigment Orange 43; (xiv) perylene pigments such as C.I. Pigment Black 32, C.I. Pigment Red 149, 178 and 179 and C.I. Pigment Violet 29; (xv) phthalocyanine pigments such as C.I. Pigment Violet 29, C.I. Pigment Blue 15, 15:1, 15:2, 15:3, 15:4, 15:6 and 16 and C.I. Pigment Green 7 and 36; (xvi) aniline black such as C.I. Pigment Black 1; (xvii) azomethine pigments; and (xviii) mixtures thereof.

Suitable effect pigments are selected from the group consisting of (i) plate-like metallic effect pigments such as plate-like aluminum pigments, gold bronzes, fire-colored bronzes, iron oxide-aluminum pigments; (ii) pearlescent pigments, such as metal oxide mica pigments; (iii) plate-like graphite pigments; (iv) plate-like iron oxide pigments; (v) multi-layer effect pigments from PVD films; (vi) liquid crystal polymer pigments; and (vii) mixtures thereof.

Preferably, the pigment premixture (PP) comprises an organic pigment (i.e. an organic coloring pigment).

The pigment premixture (PP) also preferably contains a solvent, in particular an organic solvent. Suitable solvents are described above in the context of the clearcoat system (CS) and are hereby incorporated by reference also with regard to the pigment premixture (PP). Accordingly, the pigment premixture (PP) preferably is solvent-based.

Furthermore, the pigment premixture preferably comprises generally known additive constituents in order to stabilize the pigment (C) within the solvent. Such additive constituents may be selected from dispersants, wetting agents and/or emulsifiers. Such additive compounds may be selected according to individual needs and requirements and are known by the person skilled in the art. The same hold for the amounts of these additive constituents.

A preferred group of additives are polymeric dispersants like those produced by controlled free radical polymerization method (CFRP). As knows, this method enables for defined polymer architecture and, in particular, low polydispersity. A representative example of such polymeric dispersants is EFKA PX 4350 (BASF SE).

Additionally, even if not always required and/or needed, binder resin constituents may be present in the pigment premixture (PP), As known, such constituents also may facilitate stabilization of pigments. Preferred resin constituents are polyesters, which preferably are used in form of dispersions or solutions of the polyester in organic solvents.

Production of the pigment premixture may be conducted by conventional means, i.e. mixing and/or milling the respective constituents in standard mixing and/or milling equipment.

Preferably, production of the at least one pigment premixture involves at least one milling step of a mixture comprising the at least one pigment. Preferably, the respective mixture also comprises solvents and additive constituents, i.e. dispersants, wetting agents and/or emulsifiers. Milling, as known, means that respective constituents are brought into contact under a shear high enough to effect dispersion of the pigments, i.e. to wet the surface of the pigment particles. Also, the milling process involves the use of milling media, i.e. milling beads like glass beads. Thereby, the shear introduced by this milling process also causes to break pigment agglomerates down to smaller particle sizes and eventually to the primary pigment particles.

Respective milling equipment like high energy mills and respective procedures are well known a can be chosen depending on the individual case. The preferably applied milling beads (which are well-known) generally have particle sizes of, for example, about 0.05 to 10 mm, preferably 0.1 to 5 mm or 0.1 to 1 mm (diameter), whereby milling may take place for a duration of, for example, 1 to 20 hours. Under these conditions, commercially available milling equipment may provide for an energy input (specific energy) of, for example, 100 to 10000 Wh/kg, preferably 500 to 5000 Wh/kg. Also, the milling process may be conducted in different milling steps, which, for example differ in terms of bead size, weight ratio of mixture and beads and/or milling duration (and thus also in terms of energy input). After milling, the prepared dispersion is separated from the milling beads, in particular by filtration.

The total amount of pigment (C), based on the total weight of the pigment premixture (PP), may be chosen according to individual needs. Preferably, however, the total amount of pigment (C) is from 3 to 30 wt.-%, more preferably from 5 to 15 wt.-%, based in each case on the total weight of the pigment premixture (PP).

As outlined in the introductory part, the prior art materially correlates low haze (high transparency) of a pigment paste/a pigment premixture (PP) containing the at least one pigment (C) with beneficial coloristic properties of the finally resulting coating. However, as shown below and as also already mentioned in the introductory part, this aspect is not the main and decisive part to gain optimal properties. Still, it is preferred that the pigment premixture (PP) has a haze of below 20%, preferably of below 15%, more preferably of below 7.5%.

The term “haze” is known to a person skilled in the art. Haze is a measurement of the transparency as defined in ASTM D 1003. The method for measuring the haze of the inventively used (and comparatively used) pigment pastes is described in the ‘Methods’ section hereinafter.

Volume average particle size, Z-average particle size and number-based median primary particle size as well as haze can be adjusted/reduced by subjecting the pigment (C) present in form of a pigment premixture (PP) to milling conditions as outlined above.

The total amount of the at least one pigment premixture (PP), based on the total weight of the tinted clearcoat composition (TCC), may be chosen according to individual needs. Preferably, however, the total amount of the at least one pigment premixture (PP) is from 2 to 15 wt.-%, preferably 2 to 10 wt.-%, based in each case on the total weight of the tinted clearcoat composition (TCC).

The inventive tinted clearcoat compositions preferably comprise the at least one pigment (C) in a total amount of 0.05 to 10 wt.-%, preferably 0.1 to 4 wt.-%, very preferably 0.1 to 1.0 wt.-%, based on the total weight of the tinted clearcoat composition.

Further Constituents:

As already outlined above, the essential constituents of the inventive tinted clearcoat composition (TCC) are comprised in the clearcoat system (CS) and the pigment premixture. Also, as already mentioned above, in particular by means of the clearcoat system (CS), the inventive tinted clearcoat composition already contains all constituents which are required for a functioning clearcoat composition (i.e. a composition being suitable as clearcoat composition). Still, as likewise already stated above, it is not excluded that the final tinted clearcoat composition may contain certain amounts of constituents for final completion, for example solvents in order to adjust application viscosity.

Production of the Inventive Clearcoat Composition (TCC):

Essential and novel characteristics of the inventive clearcoat composition are realized by means of certain process features during production. Accordingly, these process features lead to these novel characteristics of the inventive composition (TCC), thereby also leading to advantageous technical properties. Furthermore, at present, except for the below described process specific features, no other way of defining these novel characteristics is presently known.

The steps (a) and (b) of the process by which means the tinted clearcoat composition is producible are (a) the provision of a clearcoat system (CS) and (b) the provision of a pigment premixture (PP). Both the clearcoat system (CS) and the pigment premixture as well as their way of production are outlined above.

Step (c) of the process is to combine all or part of the clearcoat system (CS) with at least one pigment premixture (PP), i.e., a previously provided pigment premixture (PP) and all or part of a previously provided clearcoat system (CS) are combined.

As described above, all or part of the clearcoat system (CS) are combined with the pigment premixture (PP).

As also already described above, in a first alternative "part" may mean that only part of the constituents of the clearcoat system (CS) are combined with the pigment premixture (PP). Thereby, from the part of constituents to be combined either their entire amounts or only part of their entire amounts may be applied. Also, quite obviously, it is also conceivable to apply the entire amount of one or more constituents, while only part of the entire amount of one or more other constituents are applied. "Entire" amount means the full amount which is meant to be applied in the clearcoat system (CS). In case of, for example, a two-component clearcoat system, a scenario to be subsumed under this first alternative would be that part of or the entire main binder component (I) (i.e. part of or the entire previously produced main binder component (I)) is combined with the pigment premixture (PP) in step (c), while the hardener component (II) is only added at a later stage, i.e., in step (e) (as defined below).

In a second alternative "part" means that all constituents of the clearcoat system (CS) are combined with the pigment premixture (PP); however, at least one of the constituents is not applied in its full amount. In case of, for example, a one-component clearcoat system (CS), using only a part of the (already finally produced) clearcoat system (CS) in step (c) would fulfill this alternative. Thereby, all constituents are applied and, furthermore, all these constituents are not applied in their full amounts in step (c).

It is preferred that the part of the clearcoat system (CS) to be combined with the pigment premixture contains, in any case the at least one binder resin (A).

As outlined above, the clearcoat system (CS) and thus the tinted clearcoat composition (TCC) preferably is a two-component coating system/composition. Even more preferred, in this embodiment, only part of the clearcoat system (CS) is combined with the pigment premixture (PP). More preferably, the part of the clearcoat system (CS) to be combined with the pigment premixture (PP) is all or part of the main binder component (I). Most preferred, in this regard, is that the part of the clearcoat system (CS) to be combined with the pigment premixture (PP) is part of the main binder component (I).

Within the context of the above preferred embodiments, i.e., where all or part of the main binder component (I) is combined with the pigment premixture (PP), it is preferred to have a weight ratio of all or part of the main binder component (I) to the at least one pigment premixture (PP) of from 10:90 to 99:1, more preferably from 15:85 to 98:5, even more preferably from 20:80 to 97:3.

The amount of pigment within the mixture resulting in step (c) preferably is from 0.1 to 10 wt.-%, more preferably from 0.2 to 7.5 wt.-%, based on the total amount of the mixture resulting in step (c).

Step (d) of the process is to mill the mixture obtained in step (c). This step may be called decisive for the present invention. It means, in particular, that at least a part of the clearcoat system (CS), i.e. at least a part of a respective formulation that makes up a clearcoat composition, i.e., a composition that may already be used as clearcoat composition, and the pigment premixture (PP) are milled after having been combined. In other words: This step, quite obviously, is different from simply milling constituents of a standard pigment paste and/or pigment premixture but means that an already provided pigment premixture (PP) is milled with at least a part of the constituents of the clearcoat system (CS) and thus constituents of the final tinted clearcoat composition (TCC).

Both the underlying principles of milling and also generally applicable conditions (e.g. milling bead diameter, duration, energy input) are already mentioned above within the description of production of the pigment premixture (PP). Still, it has been figured out that specific conditions are of advantage during step (d), namely that the applied milling beads preferably have particle sizes of 0.05 to 10 mm, more preferably 0.05 to 2.5 mm or 0.05 to 0.5 mm (diameter), whereby milling may take place for a duration of, for example, 1 to 20 hours. Under these conditions, commercially available milling equipment may provide for an energy input (specific energy) of, for example, 100 to 10000 Wh/kg, preferably 500 to 2500 Wh/kg.

By means of the milling step (d) and the thereby resulting mixture, compatibility of the pigment premixture (PP) and the underlying clearcoat material (i.e. the clearcoat system (CS)) is achieved, ultimately leading to excellent coloristic properties of the final clearcoat layer and multilayer coating, respectively. While it has surprisingly been found that the haze of the mixture obtained after step (d) does not necessarily correlates with and thus is exclusively responsible for improved coloristic properties of the final clearcoat layer and multilayer coating, the haze may be chosen in that it is not more than 25%, preferably not more than 20%. Preferred ranges are from 0.5 to 25%, preferably 1 to 20%.

After milling in step (d), in a further step (e) any yet missing parts of the tinted clearcoat composition (TCC) are mixed with the mixture obtained after step (d). These missing parts, quite obviously, may be the residual part of the clearcoat system (CS) (in case that only part of the clearcoat system (CS) was applied in step (c)). However, also further constituents are generally conceivable, for example solvents or other constituents that are added for completion.

After having finished step (e), the inventive tinted clearcoat composition has been provided.

Preferably, the total solid content of the tinted clearcoat composition (TCC) is in the range of from 10 to 65 wt.-%, more preferably of from 15 to 60 wt.-%, even more preferably of from 20 to 50 wt.-%, in particular of from 25 to 45 wt.-%, in each case based on the total weight of the tinted clearcoat composition.

Process of Production of an Inventive Tinted Clearcoat Composition (TCC)

The present invention also relates to a process of production of the tinted clearcoat composition (TCC). The essential steps of production of the tinted clearcoat composition are fully described and defined above. Also, any and all preferred features and embodiments outlined above likewise apply for the process of production of the tinted clearcoat composition (TCC). The same holds for any and all aspects of the tinted clearcoat composition (TCC) as such, in particular preferred constituents of the composition.

Multilayer Coating and Process of Production of Such Multilayer Coating

Also, the present invention relates to a multilayer coating comprising a layer prepared by the tinted clearcoat composition and also a process of producing such a multilayer coating. Again, within the context of the multilayer coating and process of production of such a multilayer coating, both the essential features and also any and all preferred embodiments regarding the inventive clearcoat composition (TCC) likewise apply.

The inventive process of production of a multilayer coating includes the following steps, i.e.

(1) providing an optionally pre-coated substrate,
(2) applying a pigmented basecoat composition to the optionally pre-coated substrate according to step (1), thereby producing a first basecoat film,
(3) optionally applying at least one further pigmented basecoat composition different from the basecoat composition applied in step (2) to the first basecoat film present on the substrate after step (1), thereby producing at least one further basecoat film on top of the first basecoat film, and
(4) applying a tinted clearcoat composition to the uppermost basecoat film produced in step (2) and optional step (3), thereby producing a tinted clearcoat film on top of the prementioned uppermost basecoat film, whereby the tinted clearcoat composition applied in step (4) is an inventive tinted clearcoat composition (TCC).

Preferably, all of the above steps are performed via spray application.

The above-mentioned coating films formed on the optionally pre-coated substrate by performing steps (2) to (4) are at this stage preferably each uncured coating films. Thus, the coating compositions applied in each of these steps are preferably applied wet-on-wet. In this case, curing then takes place afterwards, i.e., all coating films are jointly cured after their production.

Also, preferably, the above-mentioned coating films are adjacent to each other, i.e. lie directly on top of each other without any further coating film/layer in between. More particularly, this means that the at least one further basecoat film produced in step (3) is adjacent to the first basecoat film produced in step (2) and the tinted clearcoat film produced in step (4) is adjacent to the uppermost basecoat film produced in step (2) and optional step (3).

The method of the invention is particularly suitable for the coating of automotive vehicle bodies or parts thereof including respective metallic substrates, but also plastic substrates such as polymeric substrates. Consequently, the preferred substrates are automotive vehicle bodies or parts thereof.

Suitability as metallic substrates used in accordance with the invention are all substrates used customarily and known to the skilled person. The substrates used in accordance with the invention are preferably metallic substrates, more preferably selected from the group consisting of steel, preferably steel selected from the group consisting of bare steel, cold rolled steel (CRS), hot rolled steel, galvanized steel such as hot dip galvanized steel (HDG), alloy galvanized steel (such as, for example, Galvalume, Galvannealed or Galfan) and aluminized steel, aluminum and magnesium, and also Zn/Mg alloys and Zn/Ni alloys. Particularly suitable substrates are parts of vehicle bodies or complete bodies of automobiles for production.

Preferably, thermoplastic polymers are used as plastic substrates. Suitable polymers are poly(meth)acrylates including polymethyl(meth)acrylates, polybutyl (meth)acrylates, polyethylene terephthalates, polybutylene terephthalates, polyvinylidene fluorides, polyvinyl chlorides, polyesters, including polycarbonates and polyvinyl acetate, polyamides, polyolefins such as polyethylene, polypropylene, polystyrene, and also polybutadiene, polyacrylonitrile, polyacetal, polyacrylonitrile-ethylene-propylene-diene-styrene copolymers (A-EPDM), ASA (acrylonitrile-styrene-acrylic ester copolymers) and ABS (acrylonitrile-butadiene-styrene copolymers), polyetherimides, phenolic resins, urea resins, melamine resins, alkyd resins, epoxy resins, polyurethanes, including TPU, polyetherketones, polyphenylene sulfides, polyethers, polyvinyl alcohols, and mixtures thereof. Polycarbonates and poly(meth)acrylates are especially preferred.

The substrate used in accordance with the invention is preferably a metallic substrate pretreated with at least one metal phosphate such as zinc phosphate and/or pretreated with at least one an oxalate. A pretreatment of this kind by means of phosphating, which takes place normally after the substrate has been cleaned and before the substrate is electrodeposition-coated, is in particular a pretreatment step that is customary in the automobile industry.

As outlined above the substrate used may be a pre-coated substrate, i.e., a substrate bearing at least one cured coating film. The substrate provided in step (1) can be pre-coated with a cured electrodeposition coating layer. The substrate can, e.g., be provided additionally or alternatively with at least one cured or uncured primer coating film as at least one additional pre-coat. The term "primer" is known to a person skilled in the art. A primer typically is applied after the substrate has been provided with a cured electrodeposition coating layer. In case a cured primer coating film is also present, the cured electrodeposition coating film is present underneath and preferably adjacent to the cured primer coating film. Curing of this primer may take place at temperatures in the range of from 40 to 140° C. and may in particular include a "low baking" step at a temperature in the range of from 80 to 100° C. As outlined above a substrate provided with an uncured primer coating film may also be used, in particular a substrate such as a metallic substrate bearing a cured electrodeposition coating film, onto which said uncured primer coating film is present. The inventive method thus may comprise an additional step to be performed prior to step (1), according to which a primer composition is applied to an optionally pre-coated substrate and forming a primer coating film on the optionally pre-coated substrate. The primer may be separately cured or only flashed-off such as a flash-off period of 1 to 20 minutes, preferably at a temperature not exceeding 40° C., such as at a temperature in the range of from 18 to 30° C., meaning that curing of the primer takes place at a later stage.

The basecoat compositions applied in step (2) and optionally step (3) are each preferably aqueous, i.e., waterborne, coating compositions. However, the basecoat compositions applied in step (2) and optionally step (3) may alternatively be solvent-based basecoat compositions. Preferably, the basecoat compositions applied in step (2) and optionally step (3) are one-component or two-components compositions, more preferably one-component compositions.

The term "solvent-based" is already elucidated above. The term "aqueous" or "waterborne" is understood preferably for the purposes of the present invention to mean that water is present as the main constituent of all solvents and/or diluents present in the respective compositions, preferably in an amount of at least 35 wt.-%, based on the total weight of the respective composition. More preferably, the composition includes a water fraction of at least 40 wt.-%, more preferably of at least 45 wt.-%, very preferably of at least 50 wt.-%, based in each case on the total weight of the respective composition. The fraction of organic solvent(s) is preferably <20 wt.-%, more preferably in a range of from 0 to <20 wt.-%, very preferably in a range of from 0.5 to 20 wt.-% or to 17.5 wt.-% or to 15 wt.-% or to 10 wt.-%, based in each case on the total weight of the respective composition.

As pigmented basecoat compositions applied according to step (2) and optional step (3) compositions customary known for these purposes may be selected.

As mentioned above, it is preferred that all coating films produced in steps (2) to (4) are jointly cured, meaning that after application of the basecoat compositions the respective films are, for example, flashed-off before a further composition is applied, preferably for a period of 1 to 20 minutes, more preferably for 2 to 15 minutes. Preferably, flash-off is performed at a temperature not exceeding 40° C., more preferably at a temperature in the range of from 18 to 30° C.

The term "flashing off" in the sense of the present invention preferably means a drying, wherein at least some and/or some amounts of the solvents (water and/or organic solvent(s)) are evaporated from the coating film, before the next coating composition is applied and/or a curing is carried out. No curing is performed by the flashing-off.

In step (4) the inventive tinted clearcoat composition (TCC) is applied. Preferably, after application of the composition (TCC) no further coating composition is applied, meaning that the film and layer, respectively, formed by the composition (TCC) is the uppermost layer of the produced multilayer coating.

As also already mentioned above, step (4) is preferably performed before curing of the at least one basecoat film according to step (2) and optionally step (3) is performed.

After having produced the tinted clearcoat film by applying the composition (TCC) in step (4), the film may be flashed-off as in principle described above.

The inventive process preferably comprises, as a further step (5), the jointly curing of the film applied in steps (2) to (4). Thereby, a cured multilayer coating is resulting.

Preferably, step (5) is performed at a temperature less than 150° C., preferably less than 130° C., in particular at a temperature in the range of from 15 to 110° C. or of from 15 to 90° C., for a period of 5 to 45 minutes, preferably for a period of 20 to 45 minutes, in particular for a period of 25 to 35 minutes.

Use of the Inventive Tinted Clearcoat Composition (TCC)

Finally, the present invention relates to the use of the tinted clearcoat composition (TCC) to improve the coloristic properties of a coating, in particular a multilayer coating.

Methods

1. Determining the Non-Volatile Fraction

The nonvolatile fraction (the solids or solids content) is determined in accordance with DIN EN ISO 3251 (date: June 2019). This involves weighing out 1 g of sample into an aluminum dish which has been dried beforehand and drying the dish with sample in a drying cabinet at 180° C. for 30 minutes, cooling it in a desiccator, and then reweighing. The residue, relative to the total amount of sample employed, corresponds to the nonvolatile fraction (in % or wt.-%)

2. Haze

The mixture, for example pigment premixture or pigment paste to be subjected to haze measurements, is diluted with deionized water (in case of aqueous pigment pastes) or with n-butyl acetate (in case of solventborne pigment pastes) to provide suitable diluted samples which are then used for the measurement. The measurements are performed within 24 hours of preparation of the to be measured sample. As device for measuring the haze a Haze Guard Plus instrument, which is available from Byk-Gardner, has been used. The instrument is calibrated using deionized water or n-butyl acetate as the reference standard in a solution-based quartz cuvette flow sample holder. A 500 micron path-length cell is used for the measurements. Measurements are performed at a transmission of 17.5%+1.0% at the wavelength of maximum absorbance (adjustment of transmittance by dilution in deionized water or butyl acetate as outlined above).

3. Measurement of Color Values (L*, a*, b*) and $\Delta E^*_s$

The L*a*b* color space or the L*a*b* color model (i.e. the CIELAB color model) is known to a person skilled in the art. The L*a*b* color model is standardized e.g., in DIN EN ISO/CIE 11664-4:2020-03. Each perceivable color in the L*a*b*-color space is described by a specific color location with the coordinates {L*, a*, b*} in a three dimensional coordinate system. The a*-axis describes the green or red portion of a color, with negative values representing green and positive values representing red. The b*-axis describes the blue or yellow portion of a color, with negative values for blue and positive values for yellow. Lower numbers thus indicate a more bluish color. The L*-axis is perpendicular to this plane and represents the brightness (lightness). The L*-axis has the end points black (L=0) and white (L=100). Lower values thus indicate a darker color. The color values L*, a* and b* of a coated substrate (after curing) are determined in accordance with ASTM E 284-81a after its preparation including curing.

Creation of a black surface and application of the tinted clearcoat composition to result in multilayer coatings: 100 parts of a black pigment paste is mixed with 20 parts of a mixing clear component (p/B=0.39). This mixture (i.e. a basecoat) is applied on a metal panel with a 150 micrometer wire bar applicator. The created layer is dried for 10 min at room temperature and afterwards for 10 minutes at 80° C. After the panel has cooled down to room temperature, the tinted clearcoat composition is applied. The tinted clearcoat composition is applied with a 100 micrometer wire applicator. The basecoat layer and tinted clearcoat layer are jointly cured at a temperature of 130 C for 30 minutes.

The values are measured by making use of the instrument BYK-mac I (BYK-Gardner). Analysis of the cured samples is done in accordance with color, sparkle and graininess measurement with the BYK-mac i spectrophotometer standard operating procedure. The samples to be analyzed that are completely cured are wiped down with a microfiber cloth. The BYK-mac i instrument is then placed onto the substrate surface and performs a measurement using D65 light source at −15°, 15°, 25°, 45°, 75° and 110° angles with data recorded for each angle using CIELab settings. This measurement is taken on an individual panel in at least five different positions and values are averaged over the trials and reported.

With the help of L*, a*, b*, $\Delta E^*_s$ can be calculated. $\Delta E^*_s$ describes the distance in color space of the examined system measured on a black surface with the color of the ideal black surface. For the color measures $L^*_0$, $a^*_0$, $b^*_0$, of an ideal black body applies $L^*_0=a^*_0=b^*_0=0$. With the definition of the distance in color space as in DIN EN ISO 11664-4, it applies for the scatter distance in color space $\Delta E^*_s$ of the system being examined with the color measures L*, a*, b* measured against a black surface:

$$\Delta E_s^* = \sqrt{L^{*2} + a^{*2} + b^{*2}}$$

$\Delta E^*_s$ serves as a measure of the transparency of the film. The lower the value, the more transparent the measured film is.

4. Measurement of Jetness (Mc) and Blackness (My)

Jetness and blackness of a coated substrate are determined after its preparation including curing (preparation of multilayer coatings as outlined under item 3. Measurement of color values (L*, a*, b*) and $\Delta E^*_s$). Blackness (My) is a measure of the degree of blackness, directly related to the reflectance and is e.g. defined in DIN 55979 (04-1989). Blackness (My) of a sample can be quantified by obtaining color data by making use of suitable spectrophotometer by using the general formula My=100*log(Yn/Y). Jetness (Mc) is a color dependent black value developed by K. Lippok-Lohmer (K. Lippok-Lohmer, Farbe und Lack, 92, p. 1024 (1986) and is also referred to in DIN 53235-1 (06-2005) and DIN 53235-2 (06-2005). Jetness (Mc) can be quantified by obtaining color data by making use of a suitable spectrophotometer by using the general formula Mc=100*[log(Xn/X)−log(Zn/Z)+log(Yn/Y)]. X, Y, Z are the CIE tristimulus values for the sample being measured. Xn, Yn, Zn are the tristimulus values for the light source. For the measurement the light source is the D65 light source (simulated daylight CIE standard). The standard 2° standard observer is normalized for the relative luminency, where Yn=100 yields Xn=95.047 and Zn=108.883. They also report a supplementary 10° observer with Xn=94.8110 and Zn=107.304. The values are measured by making use of the instrument BYK-mac i (BYK-Gardner). Analysis of the cured samples is done in accordance with color, sparkle and graininess measurement with the BYK-mac I spectrophotometer standard operating procedure. The samples to be analyzed that are completely cured are wiped down with a microfiber cloth. The BYK-mac I instrument is then placed onto the substrate surface and performs a measurement using D65 light source at −15°, 15°, 25°, 45°, 75° and 110° angles with data recorded for each angle using CIELab settings. The My- and Mc-values reported hereinafter in the experimental part relate to measurements at an angle of 45° and 110°.

In this special case, Mc and Mc are defining a way to describe the transparency of the Tinted Clearcoat layer. The higher the value, the more transparent the layer is.

5. Acid Number

The acid number was determined on the basis of DIN EN ISO 2114 in homogeneous solution of tetrahydrofuran (THF)/water (9 parts by volume of THF and 1 part by volume of distilled water) with ethanolic potassium 20 hydroxide solution.

6. Hydroxyl Number

The OH number is determined on the basis of R.-P. Krüger, R. Gnauck and R. Algeier, Plaste und Kautschuk, 20, 274 (1982), by means of acetic anhydride in the presence of 4-dimethylaminopyridine as a catalyst in a tetrahydrofuran (THF)/dimethylformamide (DMF) solution at room temperature, by fully hydrolyzing the excess of acetic anthydride remaining after acetylation and conducting a potentiometric back-titration of the acetic anhydride with alcoholic potassium hydroxide solution.

7. Weight Average Molecular Weight

The weight average molecular weight measured by gel permeation chromatography against a polystyrene standard, with tetrahydrofuran as eluent).

Examples

The following examples further illustrate the invention but are not to be construed as limiting its scope.

1. Production of Pigment Premixtures (PP)

PP (A)

As a first pigment premixture, the commercially available product PR179 Red Andaro Nanotint (Fa. PPG) was used. The pigment premixture (A) has a haze of 1.78 (measured as outlined above, i.e. at a transmission of 17.5%, adjusted by means of butyl acetate).

PP (B)

6 parts by weight (pbw) of EFKA PX 4350 (Fa-BASF SE) are mixed with 1.67 pbw of butyl acetate. To this mixture, 7 pbw of Paliogen Maroon L 3920 (Fa. BASF Color and Effects GmbH) are slowly added under stirring by means of a dissolver. The speed of the dissolver is chosen in a way that an effective pasting is achieved. The duration of the dissolving step is 20 minutes. Afterwards, 18.67 pbw butyl acetate are added under intensive stirring by the dissolver.

Then, the produced mixture is milled by means of an agitating mill (DCP with Micro Media unit, Fa. Bühler) equipped with milling beads having a particle size (diameter) of approximately 0.3 mm (Silibeads ZY Extrem 0.25-0.35 mm, Fa. Sigmund Lindner) until an energy input of 3000 Wh/kg.

Afterwards, additional 5.55 pbw of butyl acetate are added and the mixture is milled further until an energy input of 3500 Wh/kg. The final pigment premixture has a haze of 4.88 (measured at a transmission of 17.5%, adjusted by means of 61.11 pbw butyl acetate).

PP (C)

16 pbw of EFKA PX 4350 (Fa-BASF SE) are mixed with 5.56 pbw of a polyester resin dispersed in organic solvent (80% polyester, 20% organic solvent, namely 1.3 pbw cyclohexane, 7.6 pbw ethyl 3-ethoxypropionate, 5.5 pbw solvent naphtha 160/180 and 5.5 pbw butyl acetate). The polyester is prepared by adipic acid (6.3 pbw), 12 pbw trimethylolpropane), hexahydrophthalic anhydride (25.2 pbw) and Cardura E10 P (37.2 pbw) and has an acid number of 9 and a weight average molecular weight of 2650 g/mol.

To this mixture, 10.0 pbw of Perriondo Violett 29 2294050 (Fa. Sun Chemical) are slowly added under stirring by means of a dissolver. The speed of the dissolver is chosen in a way that an effective pasting is achieved. The duration of the dissolving step is 20 minutes. Afterwards, 24 pbw butyl acetate are added under intensive stirring by the dissolver.

Then, the produced mixture is milled by means of an agitating mill (DCP with Micro Media unit, Fa. Bühler) equipped with milling beads having a particle size (diameter) of approximately 0.3 mm (Silibeads ZY Extrem 0.25-0.35 mm, Fa. Sigmund Lindner) until an energy input of 4500 Wh/kg.

The final pigment premixture has a haze of 1.4 (measured at a transmission of 17.5%, adjusted by means of 44.44 pbw butyl acetate).

2. Production of Pigment Pastes Containing Pigment Premixtures and Part of a Clearcoat System (CS)

Pigment pastes to be applied according to the invention as well as pigment pastes to be applied for comparative purposes are produced according to steps (c) and (d).

Pigment Paste (VAA)

21.4 pbw of PP (A) are intensively mixed and homogenized with 78.6 pbw of the main binder component (I) of a clear coat system. The clearcoat system is specified in item 3, and tables 1 and 2 below.

The comparative pigment paste (VAA) has a haze of 10.4 (transmission of 17.5%, adjusted by butyl acetate).

Pigment Paste (AA)

21.4 pbw of PP (A) are mixed with 78.6 pbw of the main binder component (I) of the clear coat system. The resulting mixture is milled by means of an agitating mill (DCP with Micro Media unit, Fa. Buhler) equipped with milling beads having a particle size (diameter) of approximately 0.1 mm (Silibeads ZY Extrem 0.08-0.13 mm, Fa. Sigmund Lindner) until an energy input of 1500 Wh/kg resulting in a haze of 7.4 (transmission of 17.5%, adjusted by butyl acetate).

Pigment Paste (VBB)

30 pbw of PP (B) are intensively mixed and homogenized with 70 pbw of the main binder component (I) of the clear coat system.

The comparative pigment paste (VBB) has a haze of 19.1 (transmission of 17.5%, adjusted by butyl acetate).

Pigment Paste (BB):

30.0 pbw of PP (B) are mixed with 70.0 pbw of the main binder component (I) of the clear coat system. The resulting mixture is milled by means of an agitating mill (DCP with Micro Media unit, Fa. Buhler) equipped with milling beads having a particle size (diameter) of approximately 0.1 mm (Silibeads ZY Extrem 0.08-0.13 mm, Fa. Sigmund Lindner) until an energy input of 1500 Wh/kg resulting in a haze of 12.3 (transmission of 17.5%, adjusted by butyl acetate).

Pigment Paste (VCC)

5.0 pbw of PP (C) are intensively mixed and homogenized with 95.0 pbw of the main binder component (I) of the clear coat system.

The comparative pigment paste (VCC) has a haze of 23.1 (transmission of 17.5%, adjusted by butyl acetate).

Pigment Paste (CC):

5.0 pbw of PP (C) are mixed with 95.0 pbw of the main binder component (I) of the clear coat system. The resulting mixture is milled by means of an agitating mill (DCP with Micro Media unit, Fa. Buhler) equipped with milling beads having a particle size (diameter) of approximately 0.1 mm (Silibeads ZY Extrem 0.08-0.13 mm, Fa. Sigmund Lindner) until an energy input of 1500 Wh/kg resulting in a haze of 17.3 (transmission of 17.5%, adjusted by butyl acetate).

3. Clear Coat System (CS)

A two-component coating system comprising a main binder component (I) and a hardener component (II) is provided. For this, the two components (I) and (II) were prepared by mixing the respective constituents in the order as given in tables 1 and 2.

TABLE 1

| Main binder component (I) | |
|---|---|
| Constituent | Amount (parts by weight) |
| Hydroxyl functional poly(meth)acrylate (as a binder resin (A)). Acid number of 10, weight average molecular weight of 2600 g/mol, solids content 52% (in organic solvent); OH number (based on solids) = 165 | 15.10 |
| Hydroxyl functional polyester resin (as a binder resin (A). Acid number of 13, weight average molecular weight of 2590 g/mol, solids content 60% (in organic solvent), OH number (based on solids) = 168 | 28.20 |
| Rheology modifier (urea modified poly(metha)crylate; urea based on hexamethylene diisocyanate and benzyl amine; acid number of 16, weight average molecular weight of 7920 g/mol, solids content 60% in organic solvent). | 5.00 |
| Rheology modifier (urea modified poly(metha)crylate; urea based on hexamethylene diisocyanate and benzyl amine; acid number of 13, weight average molecular weight of 8300 g/mol, solids content 60% in organic solvent). | 20.00 |
| Setamine US-138 (n-butylated high imino melamine crosslinker supplied in butanol. Solids content 70%. | 4.71 |
| Dianol 560 (Polyetherpolyol) | 3.60 |
| Disperbyk 110 | 0.92 |
| Butyl glycol acetate | 3.80 |
| UV absorber 1130 | 1.30 |
| HALS 292 | 1.00 |
| Butyl acetate | 2.15 |
| BYK-325 | 0.12 |
| BYK 315 | 0.02 |
| Butyl acetate | 2.15 |
| Xylene | 1.90 |
| Disparlon OX-883HF | 0.06 |

TABLE 1-continued

| Main binder component (I) | |
|---|---|
| Constituent | Amount (parts by weight) |
| Butanol | 1.34 |
| Exthoxy propyl acetate | 3.06 |
| Dibasic ester | 0.92 |
| Butyl acetate | 4.65 |

TABLE 2

| Hardener Component (II) | |
|---|---|
| Constituent | Amount (parts by weight) |
| 1:1 (by weight) mixture of two Hexamethylene diisocyanate (HDI)-Trimers (both having a solids content 90%) | 88.80 |
| Butyl acetate | 5.60 |
| Solvent naphtha 160/180 | 5.60 |

4. Production of Tinted Clearcoat Compositions and Multilayer Coatings Produced Therefrom Different inventive tinted clearcoat compositions as well as tinted clearcoat compositions for comparison are produced. Furthermore, according to the Methods "Measurement of color values (L*, a*, b*) and $\Delta E^*_s$" and "Measurement of jetness (Mc) and blackness (My)" (cf. above), multilayer coatings are prepared and analyzed in terms of their color values/optical properties, whereby the measured parameters can be correlated with the degree of transparency (cf. chapter "Methods" above for more details).

TCC 1Va:

3.41 pbw of Pigment Premixture PP (A) (PR179 Red Andaro Nanotint (Fa. PPG)) is mixed with 96.58 pbw of main binder component (I) and further 33 pbw of hardener component (II).

The prepared multilayer coating has the following properties:

| ΔE*s 45° | ΔE*s 110° | MC/MY 45° | MC/MY 110° |
|---|---|---|---|
| 1.65 | 1.81 | 268/283 | 263/279 |

TCC 1Vb:

16.26 pbw of Pigment Paste (VAA) is mixed with 83.74 pbw of main binder component (I) and further 33 pbw of hardener component (II).

The properties of the prepared multilayer coating were comparable to those of the multilayer coating prepared by use of TCC1Va (above).

TCC 1:

16.26 pbw of Pigment Paste (AA) is mixed with 83.74 pbw of main binder component (I) and further 33 pbw of hardener component (II).

The prepared multilayer coating has the following properties:

| ΔE*s 45° | ΔE*s 110° | MC/MY 45° | MC/MY 110° |
|---|---|---|---|
| 1.39 | 1.35 | 277/295 | 276/293 |

The results clearly show the significantly higher transparency of the multilayer coating prepared by use of TCC 1.

TCC 2Va:

16.26 pbw of Pigment Paste (VBB) is mixed with 83.74 pbw of main binder component (I) and further 33 pbw of hardener component (II).

The prepared multilayer coating has the following properties:

| ΔE*s 45° | ΔE*s 110° | MC/MY 45° | MC/MY 110° |
|---|---|---|---|
| 1.44 | 1.47 | 273/284 | 273/284 |

TCC 2Vb 4.88 pbw of Pigment Premixture PP (B) is mixed with 95.12 pbw of main binder component (I) and further 33 pbw of hardener component (II).

The properties of the prepared multilayer coating were comparable to those of the multilayer coating prepared by use of TCC2Va (above).

TCC 2:16.

26 pbw of Pigment Paste (BB) is mixed with 83.74 pbw of main binder component (I) and further 33 pbw of hardener component (II).

The prepared multilayer coating has the following properties:

| ΔE*s 45° | ΔE*s 110° | MC/MY 45° | MC/MY 110° |
|---|---|---|---|
| 1.26 | 1.20 | 280/294 | 281/294 |

The results clearly show the significantly higher transparency of the multilayer coating prepared by use of TCC 2.

TCC 3Va:

80.64 pbw of Pigment Paste (VCC) is mixed with 19.36 pbw of main binder component (I) and further 33 pbw of hardener component (II).

The prepared multilayer coating has the following properties:

| ΔE*s 45° | ΔE*s 110° | MC/MY 45° | MC/MY 110° |
|---|---|---|---|
| 2.16 | 2.36 | 258/277 | 253/275 |

TCC 3Vb 4.03 pbw of Pigment Premixture PP (C) is mixed with 95.97 pbw of main binder component (I) and further 33 pbw of hardener component (II).

The properties of the prepared multilayer coating were comparable to those of the multilayer coating prepared by use of TCC3Va (above).

TCC 3:

80.64 pbw of Pigment Paste (CC) is mixed with 19.36 pbw of main binder component (I) and further 33 pbw of hardener component (II).

The prepared multilayer coating has the following properties:

| ΔE*s 45° | ΔE*s 110° | MC/MY 45° | MC/MY 110° |
|---|---|---|---|
| 1.64 | 1.68 | 276/298 | 275/298 |

The results clearly show the significantly higher transparency of the multilayer coating prepared by use of TCC 3.

Overall, the results show that within one and the same pigment premixture/pigment paste system combined with the applied clear coat system a lower haze of the pigment premixture/pigment paste correlates with improved properties of the multilayer coating. Also, the data show that the lower haze and thus better properties is achieved by the specific milling step (d).

However, the data also show that the adjustment of the haze as such is not sufficient to achieve good properties of the finally resulting multilayer coating. Instead, this effect is clearly overcompensated by the milling step (d) and the choice of whether this step is conducted or not, respectively. For example, this is observed when comparing TCC 1Va (use of PP (A) having a haze of 1.78) and TCC 1 (use of Pigment Paste (AA) having a haze of 7.4), whereby by means of TCC 1 significantly better properties of the final multilayer coating are achieved. The same tendency is observed by comparison with TCC 2 and TCC3 with their respective comparative examples.

The invention claimed is:

1. A tinted clearcoat composition (TCC) comprising
at least one binder resin (A) having functional groups (i),
at least one curing agent (B) having functional groups (ii) being reactive with the functional groups (i), and
at least one pigment (C),
wherein the tinted clearcoat composition (TCC) is produced by
(a) providing a clearcoat system (CS) comprising at least one binder resin (A) and at least one curing agent (B),
(b) providing at least one pigment premixture (PP) comprising at least one pigment (C),
(c) combining all or part of the clearcoat system (CS) with at least one pigment premixture (PP),
(d) milling the mixture obtained in step (c), and
(e) optionally mixing the mixture obtained in step (d) with any yet missing parts of the tinted clearcoat composition (TCC).

2. The tinted clearcoat composition (TCC) according to claim 1, wherein the production of the at least one pigment premixture (PP) comprises at least one milling step of a mixture comprising the at least one pigment (C).

3. The tinted clearcoat composition (TCC) according to claim 1, wherein its production comprises
(a) providing a clearcoat system (CS) comprising at least one binder resin (A) and at least one curing agent (B),
(b) providing at least one pigment premixture (PP) comprising at least one pigment (C),
(c) combining part of the clearcoat system (CS) with at least one pigment premixture (PP), wherein the part of the clearcoat system (CS) to be combined contains at least one binder resin (A),
(d) milling the mixture obtained in step (c), and
(e) mixing the mixture obtained in step (d) with the residual parts of the clearcoat system (CS) and, optionally with any yet further missing parts of the tinted clearcoat composition (TCC).

4. The tinted clearcoat composition (TCC) according to claim 3, wherein the clearcoat system (CS) is a two component clearcoat system comprising a main binder component (I) comprising at least one binder resin (A) and a hardener component (II) comprising at least one curing agent (B) and wherein the part of the clearcoat system (CS) applied in step (c) is all or part of the main binder component (I).

5. The tinted clearcoat composition (TCC) according to claim 4, wherein the part of the clearcoat system (CS) applied in step (c) is part of the main binder component (A).

6. The tinted clearcoat composition (TCC) according to claim 4, wherein in step (c) the weight ratio of all or part of the main binder component (I) to the at least one pigment premixture (PP) is from 10:90 to 99:1.

7. The tinted clearcoat composition (TCC) according to claim 1, wherein the mixture obtained after step (d) has a haze of not more than 25%.

8. The tinted clearcoat composition (TCC) according to claim 1, wherein at least one binder resin (A) has hydroxyl groups as functional groups and wherein the curing agent (B) is a polyisocyanate having free isocyanate groups.

9. The tinted clearcoat composition (TCC) according to claim 1, wherein at least one pigment premixture (PP) contains an organic pigment as pigment (C).

10. The tinted clearcoat composition (TCC) according to claim 1, wherein it is a solvent-based coating composition.

11. The tinted clearcoat composition (TCC) according to claim 1, wherein the pigment (C) is present in a total amount of 0.05 to 10 wt.-% based on the total weight of the tinted clearcoat composition.

12. A process of producing the tinted clearcoat composition (TCC) according to claim 1, wherein the process comprises the following steps:
(a) providing a clearcoat system (CS) comprising at least one binder resin (A) and at least one curing agent (B),
(b) providing at least one pigment premixture (PP) comprising at least one pigment (C),
(c) combining all or part of the clearcoat system (CS) with at least one pigment premixture (PP),
(d) milling the mixture obtained in step (c), and
(e) optionally mixing the mixture obtained in step (d) with any yet missing parts of the tinted clearcoat composition (TCC).

13. A process of producing a multilayer coating comprising the following steps:
(1) providing an optionally pre-coated substrate,
(2) applying a pigmented basecoat composition to the optionally pre-coated substrate according to step (1), thereby producing a first basecoat film,
(3) optionally applying at least one further pigmented basecoat composition different from the basecoat composition applied in step (2) to the first basecoat film present on the substrate after step (1), thereby producing at least one further basecoat film on top of the first basecoat film, and
(4) applying a tinted clearcoat composition to the uppermost basecoat film produced in step (2) and optional step (3), thereby producing a tinted clearcoat film on top of the prementioned uppermost basecoat film,
wherein the tinted clearcoat composition applied in step (4) is the tinted clearcoat composition (TCC) according to claim 1.

14. The process according to claim 13, further comprising
(5) jointly curing the films applied in steps (2) to (4).

15. The process according to claim 13, wherein the basecoat compositions applied in step (2) and optionally step (3) are aqueous compositions.

16. A method of using the tinted clearcoat (TCC) according claim 1, the method comprising using the tinted clearcoat composition (TCC) to improve the coloristic properties of a coating.

17. A method of using a tinted clearcoat composition (TCC) according to claim 1, wherein the method comprises using the tinted clearcoat composition (TCC) to improve the coloristic properties of a multilayer coating.

18. The tinted clearcoat composition (TCC) according to claim 4, wherein in step (c) the weight ratio of all or part of the main binder component (I) to the at least one pigment premixture (PP) is from 15:85 to 98:5.

19. The tinted clearcoat composition (TCC) according to claim 1, wherein the mixture obtained after step (d) has a haze from 1 to 20%.

20. The tinted clearcoat composition (TCC) according to claim 1, wherein the pigment (C) is present in a total amount of 0.1 to 4 wt.-% based on the total weight of the tinted clearcoat composition.

* * * * *